US009959316B2

(12) United States Patent
Korst et al.

(10) Patent No.: US 9,959,316 B2
(45) Date of Patent: May 1, 2018

(54) DEVICE AND METHOD FOR AUTOMATIC FILTER ADJUSTMENT

(71) Applicant: Funke Digital TV Guide GmbH, Berlin (DE)

(72) Inventors: Jan Korst, Eindhoven (NL); Serverius Petrus Paulus Pronk, Vught (NL); Mauro Barbieri, Eindhoven (NL)

(73) Assignee: FUNKE DIGITAL TV GUIDE GMBH, Berlin (DE)

( * ) Notice: Subject to any disclaimer, the term of this patent is extended or adjusted under 35 U.S.C. 154(b) by 279 days.

(21) Appl. No.: 14/413,069

(22) PCT Filed: Jul. 5, 2013

(86) PCT No.: PCT/EP2013/064314
§ 371 (c)(1),
(2) Date: Jan. 6, 2015

(87) PCT Pub. No.: WO2014/006209
PCT Pub. Date: Jan. 9, 2014

(65) Prior Publication Data
US 2015/0169585 A1    Jun. 18, 2015

(30) Foreign Application Priority Data
Jul. 6, 2012 (EP) .................................... 12175382

(51) Int. Cl.
*G06F 17/30* (2006.01)
*G06Q 30/02* (2012.01)
(Continued)

(52) U.S. Cl.
CPC .... *G06F 17/3053* (2013.01); *G06F 17/30867* (2013.01); *G06Q 30/0269* (2013.01);
(Continued)

(58) Field of Classification Search
USPC ......................................................... 707/748
See application file for complete search history.

(56) References Cited

U.S. PATENT DOCUMENTS 5,616,876 A * 4/1997 Cluts ................. G06F 17/30749
84/609
5,616,878 A * 4/1997 Lee ......................... G10H 1/361
84/609

(Continued)

FOREIGN PATENT DOCUMENTS

CN          102265272 A    11/2011
RU          2 451 986 C2   11/2011

(Continued)

OTHER PUBLICATIONS

Chao et al.: "A personalized recommender system based on web usage mining and decision tree induction", Expert Systems with Applications 23 (2002) 329-342.*

(Continued)

*Primary Examiner* — Kuen S Lu
(74) *Attorney, Agent, or Firm* — Ware, Fressola, Maguire & Barber LLP

(57) ABSTRACT

A method and a device for adjusting filter parameters comprises a display, a physical user interface, a memory and a processing unit. The memory comprises a sorted list of items in an ordered manner, the order determined by their rank, and each item has at least one feature-value pair that represents a value of a feature of the item. The processing unit generates a graphical representation of the items in the list in an ordered manner on the display. The processing unit responds to the user interface so as to allow a user to re-order (rearrange) and/or drop items in the graphical representation of the list of items; it modifies the rank of the items in the list, and it determines a like-degree for at least some of the feature-value pairs.

13 Claims, 3 Drawing Sheets

(51) Int. Cl.
*H04N 21/466* (2011.01)
*H04N 21/482* (2011.01)
(52) U.S. Cl.
CPC ..... *H04N 21/4662* (2013.01); *H04N 21/4668* (2013.01); *H04N 21/4826* (2013.01)

(56) References Cited

U.S. PATENT DOCUMENTS

| | | | |
|---|---|---|---|
| 5,930,784 A * | 7/1999 | Hendrickson | G06F 17/30716 |
| 6,493,702 B1 | 12/2002 | Adar et al. | |
| 7,836,057 B1 * | 11/2010 | Micaelian | G06F 17/30867 |
| | | | 707/748 |
| 7,937,725 B1 * | 5/2011 | Schaffer | H04N 7/163 |
| | | | 725/26 |
| 2002/0178057 A1 * | 11/2002 | Bertram | G06Q 30/02 |
| | | | 705/14.23 |
| 2009/0164929 A1 | 6/2009 | Chen et al. | |
| 2009/0254572 A1 * | 10/2009 | Redlich | G06Q 10/06 |
| 2010/0198777 A1 * | 8/2010 | Lo | G06F 17/30592 |
| | | | 707/601 |
| 2010/0205166 A1 * | 8/2010 | Boulter | G06F 17/30761 |
| | | | 707/705 |
| 2011/0145234 A1 | 6/2011 | Hu | |

FOREIGN PATENT DOCUMENTS

| | | |
|---|---|---|
| WO | 2006/094097 A2 | 9/2006 |
| WO | 2006/110480 A1 | 10/2006 |

OTHER PUBLICATIONS

Verus Pronk, et al; "Incorporating User Control into Recommender Systems Based on Naive Bayesian Classification;" Proceedings of the 2007 ACM Conference on Recommender Systems, RecSys 2007; pp. 73-80, Minneapolis, MN.

* cited by examiner

DEVICE AND METHOD FOR AUTOMATIC FILTER ADJUSTMENT

CROSS REFERENCE TO RELATED APPLICATIONS

This application is the U.S. National Stage of International Application Number PCT/EP2013/064314, filed on Jul. 5, 2013, which application claims priority under 35 USC § 119, to European Patent Application No. 12175382.6, filed on Jul. 6, 2012. Both applications are hereby incorporated by reference in their entirety.

TECHNICAL FIELD

The present invention relates to what are called recommender systems used to recommend items to users.

BACKGROUND OF THE INVENTION

Recommender systems have been used in various application fields to recommend items (products, TV programs, songs, etc.), to mitigate the choice-problem of users that are confronted with an excessively large collection of items to choose from. There are two general approaches to construct recommender systems. In the first approach, items are represented by multiple features and the user's preferences are also expressed in terms of these features. This approach is generally referred to as content-based recommendation. Alternatively, the purchase/viewing/listening history of a large set of users is analyzed (possibly with accompanying rating information) to identify similarity between items or similarity between users. These similarities are then used to recommend new items to a user. This second approach is often referred to as collaborative filtering. The new items proposed in a collaborative filtering approach are new items that are similar to items that the user likes, or new items that are liked by users that are similar to the given user. Note that this second approach does not require specific information on the items themselves other than purchase/viewing/listening information of multiple users.

Generally speaking, a recommender system acts as filter for filtering items that might be interesting to a user. To adapt such filter to a user's expectations and needs e.g. content-based and collaborative filtering-based approaches are known.

In both the content-based and collaborative filtering-based approaches it is well known that it is difficult to provide good recommendations to new users. A new user must first rate a number of items before the recommender can learn his preferences and is able to provide good recommendations, where rating is either on a two-point scale (like/dislike) or a scale with more points (e.g. a five-point scale including like-degrees such as strong dislike, dislike, neutral, like, strong like). A problem with creating or adapting filter parameters so that they represent a specific user's preferences is that a machine cannot talk to a user to figure out user preferences. Another problem is that the information about user preferences is needed in a format that can be processed by a machine. However, such format cannot be understood or revised by an average user. Therefore a user interface is needed that can easily be understood by a user and that allows efficient collection of data that represents a user's preference. It is an underlying technical problem to generate machine-processable information from interactions of a user that is unable to provide such information directly.

Asking a user to re-rank items is known from U.S. Pat. No. 7,836,057, which was granted Nov. 16, 2010. In U.S. Pat. No. 7,839,057, a method/system is proposed to aid a user in helping to select a product, such as buying a car. The user is explicitly given a number of selection criteria that are relevant for the given product category, and for each selection criterion, he can set, with a slider, to what extent he wants to weigh the given criterion in the product selection process. As a result the system returns an ordered list of products, where the ordering is based on the weighing of the selection criteria. Next, if the user is not satisfied with the ordering of the products, he can re-rank the list of products. The system then indicates how the weighing of the selection criteria can be adjusted to realize this re-ranked list.

The method proposed in U.S. Pat. No. 7,836,057, has a number of shortcomings that make it less suitable for more complex decision processes, such as what to watch on TV or what to rent from a video-on-demand repository. To learn the taste of a new user of a TV recommender system is more complex than setting the weights of a few selection criteria. If we consider using a naive Bayesian classification approach, then the taste of a user can be represented by like-degrees for a relatively large set of feature-value pairs (see Pronk, V., W. Verhaegh, A. Proidl, and M. Tiemann. Incorporating User Control into Recommender Systems Based on Naive Bayesian Classification, in the Proceedings of the 2007, ACM Conference on Recommender Systems, RecSys 2007, pp. 73-80, Minneapolis, Minn., USA).

The nomenclature used in this paper is adopted for the present disclosure, in particular, the use of the terms like-degree as well as skewing factor. These two are related as follows. Let r be a skewing factor. Then the associated like-degree $\lambda$ is given by $\lambda = r/(1+r)$. Conversely, for a given like-degree $\lambda$, the associated skewing factor r is given by $r = \lambda/(1-\lambda)$. A like degree of 0.5, corresponds to neutral, as it leads to the neutral skewing factor of 1. The range of possible like degrees is between 0, and 1, whereas the range of possible skewing factors is between 0, and infinity.

Feature-value pairs may relate to, for example, the presence of a certain actor in a given movie, or a specific genre, or a specific broadcast time, or a specific broadcast channel. Providing a user interface that gives a slider for each of these feature-value pairs would be impracticable. In addition, if so many feature-value pairs are involved, then it is undoable for a user to keep an overview of the weighing of all the different feature-value pairs, and manually setting these is not a practical option. Furthermore, explicit feedback of how the weights can be adjusted to realize a given re-ranking of a given list is equally difficult to interpret by a user.

An additional shortcoming of U.S. Pat. No. 7,836,057, is that feedback on how to adjust the weighing of the selection criteria is only based on a single re-ranked list. To capture the preferences of a user for generating TV recommendations, a single list of items is too restrictive to learn the delicate nuances that constitute a user taste. To capture the preferences of a user to generate TV recommendations, a series of re-ranking steps is needed, where the successive lists that the user is asked to re-rank are suitably chosen.

Yet another shortcoming of U.S. Pat. No. 7,836,057, for learning the taste of a TV watcher, is that users are asked to re-rank all items present in the list. For applications where the number of possible items to choose from is so extensive, as is the case for a TV watcher who can choose from TV shows currently broadcast, video-on-demand content, YouTube movies, etc., it is quite likely that a given list that a user is asked to re-rank contains one or more items that the user does not know. Even if additional information is given about the items, such as genre, then it would still be difficult for a user to rank them. Therefore, we propose that the user first deletes items from the list that he does not know (e.g. to be replaced by other items) before the list is to be re-ranked by the user.

Yet another shortcoming of U.S. Pat. No. 7,836,057, is that it is as such not possible to explicitly indicate which items in the list the user does not like. It may be that he likes all of them, none of them, or only the top m, where 0<, m<n. Hence, another aspect of a preferred embodiment of the invention is that the user can position a separator in the list between any pair of successive items, before the first, or after the last item, specifying the border between liked and not liked items.

SUMMARY OF THE INVENTION

It is an object of the invention to provide a device and a method that allows a user-friendly creation or adaption of a filter for filtering items depending on a user's specific needs and/or expectations.

According to a first aspect of the invention this object is achieved by a device for adjusting filter parameters, wherein the device comprises or can be connected to a display, a physical user interface and a memory. The device comprises a processing unit that is operatively connected to the display, the physical user interface and the memory. The memory comprises a (plurality of) sorted list(s) of items comprising a plurality of items in an ordered manner wherein the order of the items is determined by their rank. The processing unit is configured to generate a graphical representation of the items in the list in an ordered manner on the display. The processing unit is further configured to respond to the physical user interface so as to allow a user to re-order (rearrange) and/or drop items in the graphical representation of the list of items. The processing unit is further configured to modify the rank of the items in the list according to the graphical representation after rearrangement in response to the physical user interface. The processing unit is further configured to modify a relative rating history based on the re-ordered list and to generate from the modified relative rating history a modified set of filter parameters.

The modified set of filter parameters may for instance define a modified user profile for a recommender.

The initial sorted list of items may be sorted by some default rank that can be randomly created. Alternatively, the initial sorted list may be sorted according to a presumed or outdated user profile that needs to be updated or individualized. A benefit of the approach suggested herein is that a user sees and understands the items that are displayed without having to know which features/value pairs or other machine-processable information is associated with the displayed items while the processing unit can immediately process the information associated to the items together with the information that is encoded in the order of re-ordered or resorted list that results from the user interaction.

Preferably, the processing unit is further configured to respond to the physical user interface so as to allow a user to qualify each item as belonging to one of at least two clusters, e.g. liked or disliked. Thus, the items shown to a user can be separated into two clusters and an (absolute) rating history can be generated. This (absolute) rating history can then be further processed by any one of several classification methods (collaborative filtering, naive Bayesian classification, support vector machines, etc.) to be used as an item filter (recommender). These items filters are classifiers that typically build a user profile or model, which operate as filter parameters. Similarly, the relative rating history can be split into, say, 5, clusters, whereby each cluster represents a rating on a scale from 1, to 5, (in the order as expected). This can also, and even more appropriately, be used in a collaborative filtering environment.

To provide for a user interface that allows clustering of items is means to retrieve even more information from simple user interactions wherein the information thus retrieved is compatible with the internal representation of user preferences within the device.

According to a preferred embodiment, the processing unit is further configured to split the relative rating history into two clusters: the top-N will become liked items, the other ones disliked. As pointed out further below, this can preferably be achieved by means of a preferred embodiment of a processing unit that is configured to allow a user to position a separator in the re-arranged list between any pair of successive items, before the first, or after the last item, wherein the separator specifies the border between liked and not liked items. Such separator defines a decision threshold. Such preferred embodiment of a processing unit can comprise or can be connected to an interface unit allows displaying and moving the separator. The processing unit then is configured to use the position of the separator as an input value for generating a list of filter parameters. Because the separator can be placed before the first or after the last item, a user is able to mark all displayed items in the list as "liked" or "disliked", respectively.

In a preferred embodiment each item is characterized by at least one feature-value pair that represents a value of a feature of the item. According to this the processing unit is preferably further configured to determine a like-degree indicating factor for at least some of the feature-value pairs characterizing the items in the re-ordered list so that a product of feature-value pair like-degree indicating factors for a particular item matches the rank of the item in the re-ordered list when compared to a product of feature-value pair like-degree indicating factors of other items in the reordered list.

The rank of an item in the re-ordered list correlates with a like-degree and thus the like degree indicating factor of said item in that items with a higher rank are probably liked more by a particular user than items with a lower rank. In the preferred embodiment the device determines like-degree indicating factors of feature-value pairs so that the order of products of feature-value pair like-degree indicating factors for each item (or at least some items) corresponds to the order given by the ranks of the items.

The processing unit may further be configured to modify the rank of the items in the list according to the graphical representation after rearrangement in response to a user interaction via the physical user interface. The attribute has three states that describe what happened to the item during re-ordering, namely: (item) deleted, (item) moved up, (item) moved down.

A device according to the invention allows a user to quickly specify his preferences in a user-friendly way and to thus generate a filter for filtering items efficiently.

Thus, the invention provides a new approach to be able to quickly learn the taste of a new user, by asking the user to re-rank multiple, suitably chosen lists of items.

Preferably, the like-degree indicating factor is a skewing factor for a particular feature-value pair and the product of the skewing factors of the feature-value pairs characterizing a specific item is the skewing factor of said item. Since an item is characterized by one or more feature-value pairs and a like-degree is associated to an item, the like-degrees of the feature-value pairs characterizing a specific item and the like-degrees of that item are interrelated. If a naive Bayesian classification is used to determine like-degrees a feature-value pair has a skewing factor r and the skewing factor r(x) of an item x is given by the product $\Pi_{i \in F(x)} r_i$, of the skewing factors of the feature-value pairs F(x) characterizing said item. In such embodiment, the processing unit preferably is adapted to solve a set of linear inequalities $\Box_{i \in F(x\_j)} \Box_i > \Box_{i \in F(x\_(j+1))} \Box_i$, wherein $\Box_i$, is the logarithm $\log(r_i)$ of a skewing factor $r_i$, of an item i and wherein the notation x_j is used to indicate $x_j$.

In a further preferred embodiment, the memory comprises a plurality of ordered lists of items and wherein the processing unit is adapted to successively generate graphical representations of the items in each list in an ordered manner on the display. In such embodiment, the processing unit is further configured to respond to the physical user interface so as to allow a user to rearrange and/or drop items in the graphical representation of the lists of items and to modify the rank and the attribute of the items in the lists according to the graphical representation after rearrangement in response to the physical user interface.

Generally it is preferred that a plurality of items have at least a subset of feature-value pairs in common and wherein like-degrees are assigned to each item and to each feature-value pair such that a like-degree of an item is defined by a like-degree indicating factor (e.g. the skewing factor) that is a product of the like-degree indicating factors of the feature-value pairs characterizing said item. In this respect, it is further preferred that the processing unit is configured to calculate the like-degrees of the feature-value pairs from the rank of the items after rearrangement of the ordered list of items in response to inputs that are entered by a user via the physical user interface.

The memory preferably comprises a plurality of sorted lists of items so as to allow determining of like-degrees of a higher number of feature-value pairs without the need to confront the user with too long a list of items. If a second list of items is to be represented to a user, it is preferred that the order (the rank) of the items is determined based on like-degrees of feature-value pairs as determined in a previous filter adjustment process.

The memory preferably is configured as a database.

Preferably, the device is configured to apply a seed item that for instance is chosen by the user via the user interface and the processing unit is configured to generate the sorted list of items based on a degree of similarity between the seed item and further items stored in that memory.

According to a further aspect of the invention a method for adjusting filter parameters is provided. The method comprises the steps of:
  providing a sorted list of items comprising a plurality of items in an ordered manner wherein the order of the items is determined by their rank, and each item is characterized by at least one feature-value pair that represents a value of a feature of the item
  generating a graphical representation of the items in the list in an ordered manner on the display,
  responding to the physical user interface so as to allow a user to re-order (rear-range) and/or drop items in the graphical representation of the list of items,
  modifying the rank of the items in the list according to the graphical representation after rearrangement in response to the physical user interface and
  modifying a relative rating history based on the re-ordered list and
  generating from the modified relative rating history a modified set of filter parameters According to a preferred or alternative embodiment the method further comprises the steps of determining a like-degree indicating factor for at least some of the feature-value pairs characterizing the items in the re-ordered list so that a product of feature-value pair like-degree indicating factors for a particular item matches the rank of the items in the re-ordered list when compared to a product of feature-value pair like-degree indicating factors of other items in the reordered list.

According to a preferred embodiment the method further comprises the steps of:
  applying a seed item and
  generating the sorted list of items based on a degree of similarity between the seed item and further items stored in that memory.

It is further preferred if the method further comprises the step of:
  generating a new sorted list of items based on the determined like-degrees of the feature-value pairs characterizing the items.

According to a further preferred embodiment the method further comprises the steps of:
  generating a graphical representation of the items in the new sorted list of items in an ordered manner on the display,
  responding to the physical user interface so as to allow a user to re-order (rear-range) and/or drop items in the graphical representation of the new sorted list of items,
  modifying the rank of the items in the new sorted list according to the graphical representation after rearrangement in response to the physical user interface and
  determining a like-degree for at least some of the feature-value pairs characterizing the items in the re-ordered new list so that a product of feature-value pair like-degree indicating factors for a particular item matches the rank of the items in the re-ordered list when compared to a product of feature-value pair like-degree indicating factors of other items in the reordered list.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION

Figure 1:
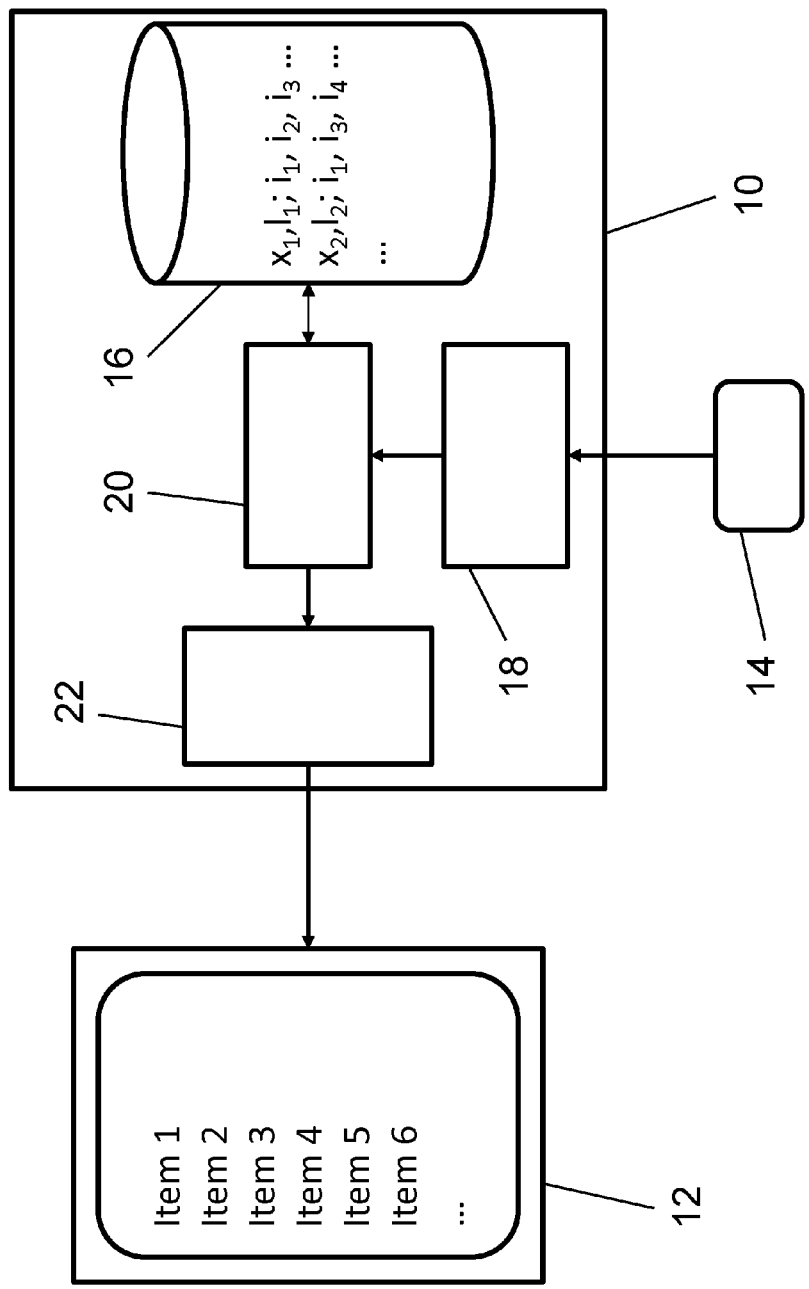
FIG. 1 is a schematic representation of a device for automatic adjustment of filter parameters.

The device 10 for automatic adjustment of filter parameters depicted in FIG. 1 is connected to a display 12 and a physical user interface 14 such as a mouse, a track pack or the like. The device comprises or is connected to a memory 16 that comprises a sorted list of items x comprising a plurality of items in an ordered manner wherein the order of the items is determined by their rank. Each item is characterized by at least one feature-value pair i that represents a value of a feature of the item. Usually, an item x is characterized by a plurality of feature-value pairs ($i_1$, $i_2$, $i_3$, ... ). Further, a like-degree λ is assigned to each item x. The like-degree of item x defines the rank of that item. The memory 16 can be an integral part of device 10 or can be a database, device 10 is connected to.

Device 10 further comprises a user interface unit 18, a processing unit 20 and a display interface unit 22.

The user interface unit 18 is configured to receive signals from the physical user interface 14 and to forward corresponding signals to processing unit 20.

Processing unit 20 is connected to memory 16 and thus can access on or more sorted lists of items as described above. Processing unit 20 further causes display interface unit 22 to generate signals that cause a graphical representation of a sorted list of items on display 12. The processing unit 20 is configured to operate as a filter adjustment unit as disclosed below.

Figure 2:
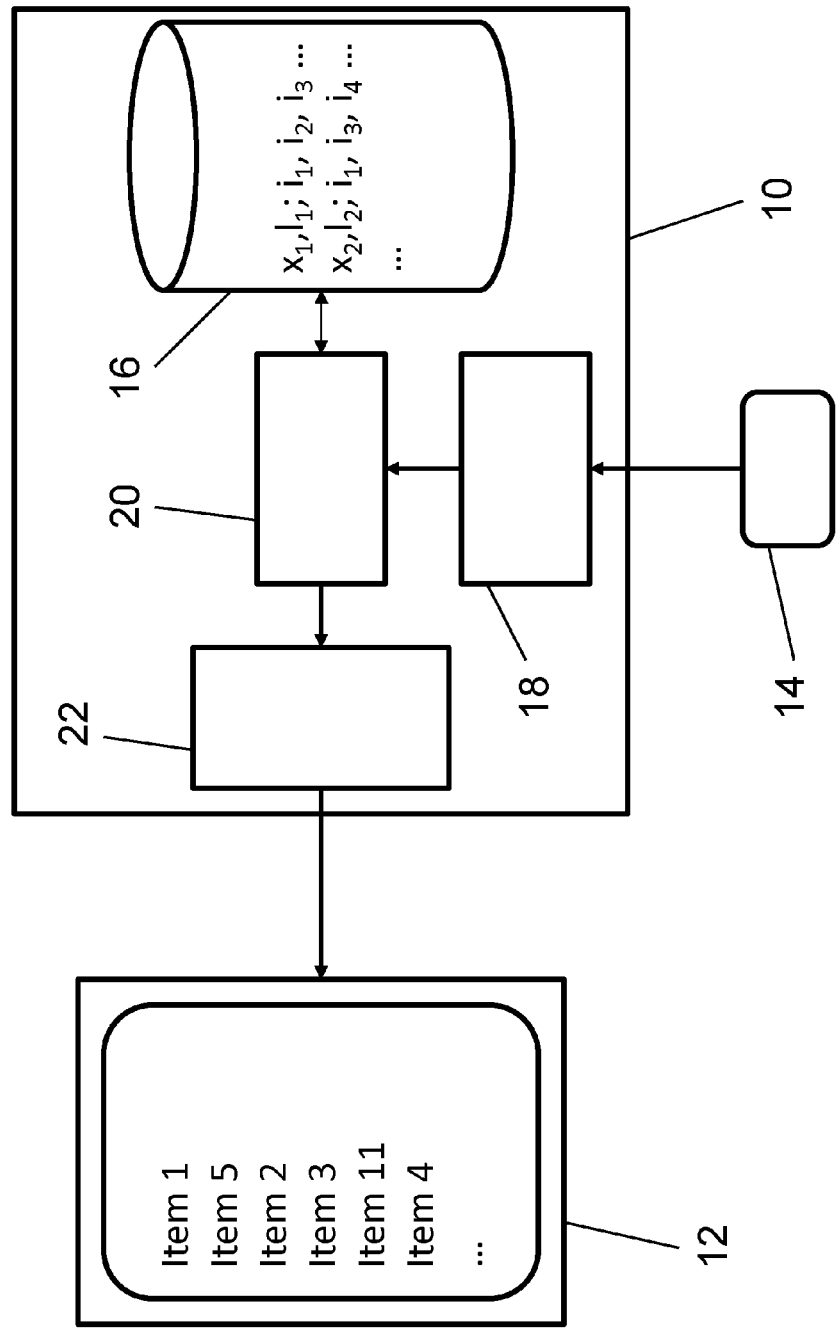
FIG. 2 is a schematic representation of the device from FIG. 1 wherein the items are re-ordered.

FIG. 2 is a representation of the device 10 for automatic filter adjustment where a user has re-ordered or re-arranged the items on display 12. The re-arrangement of the items on display 12 changes the ranks of the items. Since the rank of an item correlates to its like-degree, a different rank most likely results in a different like-degree of the item. Since the like-degree of an item depends on the like-degrees of the feature-value pairs characterizing that item a change of a rank of an item ultimately results in a re-assessment of the like-degrees of the feature-value pairs as disclosed in more detail further below.

Figure 3:
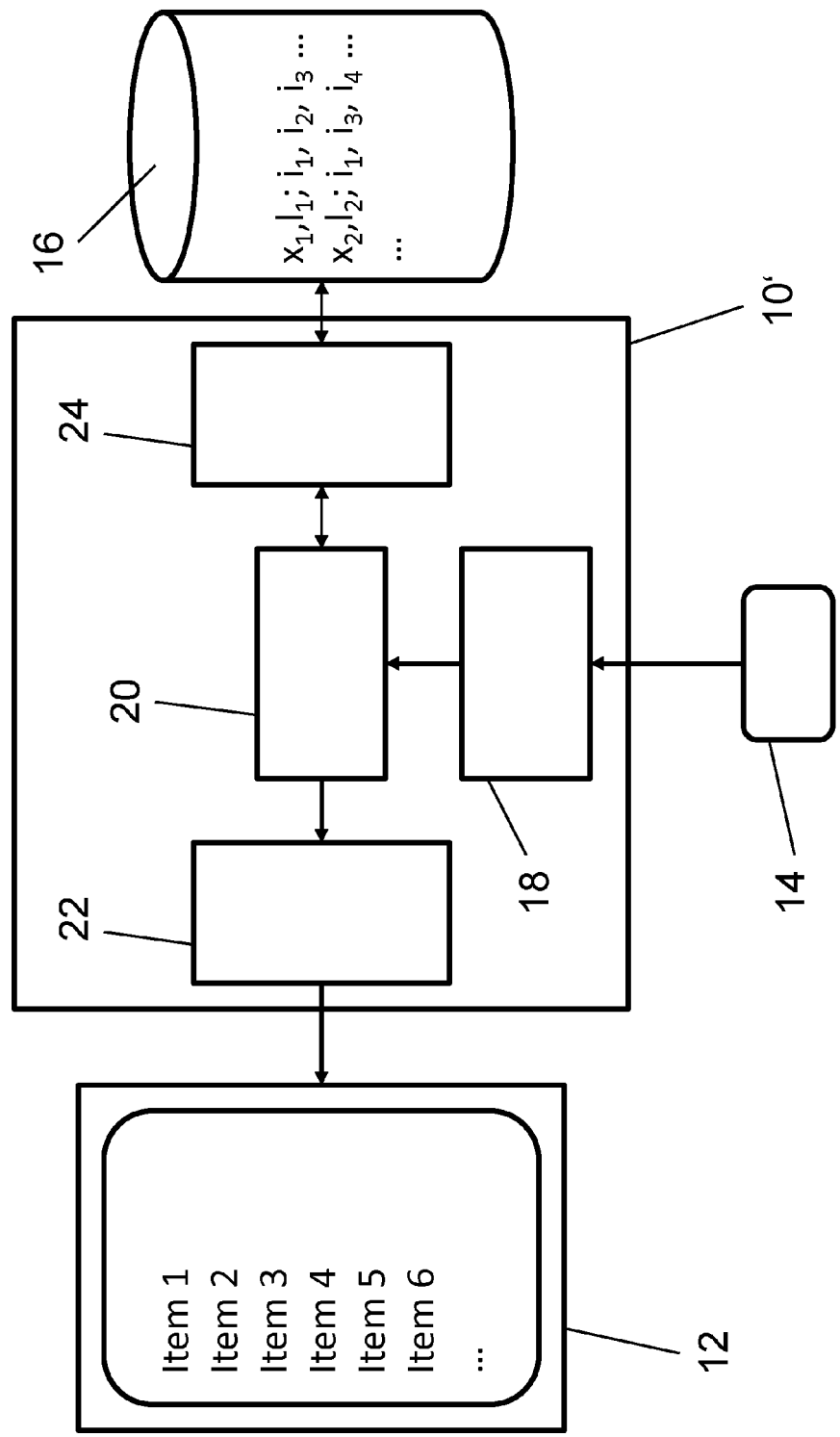
FIG. 3 is a schematic representation of an alternative device for automatic adjustment of filter parameters.

In FIG. 3, an alternative arrangement is depicted wherein memory 16 is not an integral part of the device 10' for automatic filter adjustment but part of a remote database. Accordingly, a data interface 24 is provided which allows processing unit 20 to access memory 18 in the remote database.

Now the operation of device 10 is described.

The basic idea of this invention is to provide a new user of a TV recommender system, or of a similar recommender system, an easy and convenient approach to specify his preferences—and to thus adjust an item filter—by offering in an Interactive session, a series of successive lists of items, where for each of the successive item lists, the user is asked to carry out the following steps.
1. The user deletes the items that he does not know well enough to rank them, where possibly a deleted item is replaced by another item;
2. The user re-ranks the resulting item list in order of decreasing user preference
3. Additionally, the user can position a separator in the list between any pair of successive items, before the first, or after the last item, specifying the border between liked and not liked items.

The device uses the information contained in the ordering of the re-ranked list, to adjust the like-degree of the appropriate feature-value pairs, where the information from the current re-ranked list can be combined with the Information from previous re-ranked lists. The adjusted parameters of the recommender system's filter are next used to determine an appropriate next list of items, where typically the successive lists better and better match the taste of the user.

To re-rank the list, the user simply drags and drops items from a given position in the top-n list to a new desired position in the top-n list. In this way, he just has to specify the relative user preference for the items in the top-n. It is well known from psychological studies that it is easier for a user to give a relative ranking of a given set of items, than to give absolute user preference to a set of items, which he must rate one at a time.

The deletion and re-ranking procedure is carried out a number of times, starting with re-ranking a well-chosen initial top-n list that is not yet tuned to the personal taste of the user. Based on this first re-ranked list, the recommender provides a next top-n list that already tries to represent the taste of the user somewhat better. Re-ranking this second top-n list provides the recommender with additional information about the user's taste, resulting in an even better top-n list in the next Iteration. Such re-ranking iterations can be repeated until the user is satisfied with the resulting next top-n list or with a sequence of next top-n lists. To continuously improve the recommender, the successive top-n lists can be chosen such that a single item appears at most once in these successive lists. In addition, the successive lists should also not contain items that are very similar to each other, e.g. in terms of their associated feature-value pairs.

In this way, the user gets repeatedly feedback on how well the recommender has learned his taste. This procedure is considered more stimulating than simply rating individual items, one at a time, without further feedback on how well the recommender has learned the user's taste. Because it is more stimulating (due to the repeated feedback) and it is easier to re-rank instead of individually rating items, the user will be kept motivated to continue to give feedback. As a result, the recommender will be able to provide meaningful recommendations at an earlier stage.

In the third step, the user can set a separator between the items that he wants to get recommended and the ones that he does not think sufficiently interesting to be recommended. In this way, the user is not only able to give a relative ranking of the given set of items, he is also able to specify his preferences in absolute terms. In response to the positioning of a separator between two consecutive items i and i+1, in an ordered list, processing unit 20 sets a decision threshold t to $(\lambda_i+\lambda_{(i+1)})/2$. In case the separator is positioned before the first item, processing unit 20 sets a decision threshold t to $(1+\lambda_1)/2$. In case the separator is positioned after the last item, say item n, processing unit 20 sets a decision threshold t to $\lambda_n/2$. This decision threshold can be used by a classifier to make a distinction between liked and disliked items. For example, a naive Bayesian classifier as implemented by the processing unit can set its positive prior probability, e.g., to 1−, t. Thus, the separator allows the prior probabilities present in a naive Bayesian classifier to be properly defined, allowing the classifier to also make a distinction between liked and not-liked items.

To adjust the "user profile" (that is the filter filtering items) on the basis of a re-ranked top-n list, the following embodiment is proposed. In this embodiment a recommender system is assumed that uses a naive Bayesian approach, where the like-degrees of the feature-value pairs that are relevant for the items that appear in the top-n list are directly adjusted.

Adjusting the like-degrees of feature-value pairs

For simplicity, it is assumed that the ordering of the given n items is based on the like-degree that the recommender gives to each of the n items. Let the set of all possible feature-value pairs be given by $F=\{1, 2, \ldots, N\}$. Now, an item x can be characterized by a subset $F(x) \subseteq F$.

For each feature-value pair $i \in F$ a real value $r_i \in [0, \infty, )$ specifies the skewing factor of this feature-value pair, such that the skewing factor r(x) of item x is given by $\Pi_{i \in F(x)} r_i$. The associated and more intuitive like-degree is given by $\lambda(x)$ and is given by $r(x)/(1+r(x))$.

Now, given a re-ranked list of n items, denoted by $x_1, x_2, \ldots, x_n$, the question is whether we can choose the like-degrees of the feature-value pairs i that are in the combined set of feature-value pairs $F(x_1) \cup F(x_2) \cup \ldots \cup F(x_n)$ of feature-value pairs, such that the order of like-degrees of the items $\lambda(x_1) > \lambda(x_2) > \ldots > \lambda(x_n)$ matches the order defined by the rank in a re-ordered (or rearranged) list of items. As the transformation between like-degree and skewing factor is monotonically increasing, we may alternatively state this as whether we can choose the skewing factors of the feature-value pairs i that are in $F(x_1) \cup F(x_2) \cup \ldots \cup F(x_n)$, such that $r(x_1) > r(x_2) > \ldots > r(x_n)$.

Next, using that the logarithm is a monotonically increasing function, this problem can be simplified to solving a set of linear inequalities as follows. If we denote $\log(r_i)$ by $\rho_i$, then the inequality $r(x_j) > r(x_{j+1})$ can be restated as $\Sigma_{i \in F(x\_j)} \rho_i > \Sigma_{i \in F(x\_(j+1))} \rho_i$, wherein the notation x_j is used to indicate $x_j$.

This problem can be stated as a set of linear equations with restrictions, for which a solution, if it exists, can be determined efficiently, for example by using the Simplex method. If no such solution exists, a search can be conducted to find one with, e.g., a minimal number of unsatisfied constraints.

This procedure can be repeated with several, appropriately chosen lists such that a relatively larger part of the feature-value space is covered and a more complete profile of the user is created. There are several ways to generate new lists of highly rated items, e.g., by using the profile constructed thus far to create a ranked list of randomly chosen, new items. Alternatively, a set of programs may be chosen that is more homogeneous in terms of, e.g., genre. Yet another alternative is to zoom in on one or more distinguishing features of the profile built thus far, e.g. on those that stand out in terms of high like-degrees.

In the context of personal channels (see Pronk, V., J. Korst, M. Barbieri, and A. Proidl. Personal television channels: simply zapping through your PVR content, in the Proceedings of the 1st International Workshop on Recommendation-based Industrial Applications, in conjunction with the 3rd ACM Conference on Recommender Systems, RecSys 2009, New York City, NY.), it is common for a user to generate a number of these personal channels. The creation of a personal channel typically starts by the user selecting a so-called seed program. Now, this process of learning the taste that corresponds to a newly generated personal channel can be implemented along the lines of the current embodiment, where the chosen seed program is used to steer the construction of the successive item lists, such that primarily items are added to these lists that are similar (closely or remotely) to the given seed program.

The invention can be applied in any context where recommenders can be used, e.g., in the context of books, songs, rental videos, et cetera. In addition, it can be used in the context of personal channels. A separate recommender can be associated to each channel, and the new-user problem, more appropriately called new-channel problem, may be encountered several times.

The invention claimed is:

1. A device for adjusting filter parameters, the device comprises or can be connected to
   a display, a physical user interface and a memory,
   the device further comprises a processing unit that is or can be operatively connected to the display, the physical user interface and the memory,
   wherein the memory comprises a sorted list of items comprising a plurality of items in an ordered manner, wherein the order of the items is determined by their rank, and
   wherein the processing unit is configured to generate a graphical representation of the items in the list in an ordered manner on the display,
   wherein the processing unit is further configured to respond to the physical user interface so as to allow a user to rearrange and/or drop items in the graphical representation of the list of items to thus generate a re-ordered list,
   wherein the processing unit is further configured to modify the rank of the items in the list according to the graphical representation after rearrangement in response to the physical user interface,
   wherein the processing unit is further configured to modify a relative rating history based on the re-ordered list and to generate from the modified relative rating history a modified set of filter parameters,
   wherein the processing unit is further configured to respond to the physical user interface so as to allow a user to qualify each item as belonging to one of a predetermined number of like-degree related clusters,
   wherein the each item is characterized by at least one feature-value pair that represents a value of a feature of the item and wherein the processing unit is further configured to determine a like-degree indicating factor for at least some of the feature-value pairs characterizing the items in the re-ordered list so that a product of feature-value pair like-degree indicating factors for a particular item matches the rank of the item in the re-ordered list when compared to a product of feature-value pair like-degree indicating factors of other items in the reordered list, and
   wherein the like-degree indicating factor is a skewing factor for a particular feature-value pair and wherein the product of the skewing factors of the feature-value pairs characterizing a specific item is the skewing factor of said item.

2. The device according to claim 1, wherein the processing unit is adapted to solve a set of linear inequalities $\Sigma_{i \in F(x\_j)} \rho_i > \Sigma_{i \in F(x\_(j+1))} \rho_i$, wherein $\rho_i$, is the logarithm $\log(r_i)$ of a skewing factor $r_i$, of an item i and wherein the notation x_j is used to indicate $x_j$.

3. The device according to claim 1,
   wherein the memory comprises a plurality of ordered lists of items and
   wherein the processing unit is adapted to successively generate graphical representations of the items in each list in an ordered manner on the display, and
   wherein the processing unit is further configured to respond to the physical user interface so as to allow a user to rearrange and/or drop items in the graphical representation of the lists of items and to modify the rank of the items in the lists according to the graphical representation after rearrangement in response to the physical user interface.

4. The device according to claim 1,
   wherein a plurality of items have at least a subset of feature-value pairs in common and
   wherein like-degree indicating factors are assigned to the each item and to each feature-value pair such that a like-degree indicating factor of an item is defined by a product of the like-degree indicating factors of the feature-value pairs characterizing said item.

5. The device according to claim 4,
   wherein the processing unit is configured to calculate the like-degree indicating factors of the feature-value pairs from the rank of the items after rearrangement of the ordered list of items in response to inputs via the physical user interface.

6. The device according to claim 1, wherein the device is configured to apply a seed item and the processing unit is configured to generate the sorted list of items based on a degree of similarity between the seed item and further items stored in that memory.

7. The device according to claim 1, wherein the memory is configured as a database.

8. The device according to claim 1, wherein the device is configured to allow entering a separator in the sorted list between any pair of successive items, before the first, or after the last item and wherein the processing unit is configured to set a decision threshold t in response to the positioning of a separator between any pair of successive items, before the first, or after the last item.

9. A method for adjusting filter parameters, the method comprising the steps of:
providing a sorted list of items comprising a plurality of items in an ordered manner wherein the order of the items is determined by their rank,
generating a graphical representation of the items in the list in an ordered manner on the display,
responding to the physical user interface so as to allow a user to re-order (rearrange) and/or drop items in the graphical representation of the list of items,
modifying the rank of the items in the list according to the graphical representation after rearrangement in response to the physical user interface,
modifying a relative rating history based on the re-ordered list,
generating from the modified relative rating history a modified set of filter parameters,
allowing a user to qualify each item as belonging to one of a predetermined number of like-degree related clusters,
wherein the each item is characterized by at least one feature-value pair that represents a value of a feature of the item,
determining a like-degree indicating factor for at least some of the feature-value pairs characterizing the items in the re-ordered list so that a product of feature-value pair like-degree indicating factors for a particular item matches the rank of the item in the re-ordered list when compared to a product of feature-value pair like-degree indicating factors of other items in the reordered list, and
wherein the like-degree indicating factor is a skewing factor for a particular feature-value pair and wherein the product of the skewing factors of the feature-value pairs characterizing a specific item is the skewing factor of said item.

10. The method according to claim 9, wherein the method further comprises the steps of:
applying a seed item and
generating the sorted list of items based on a degree of similarity between the seed item and further items stored in that memory.

11. The method according to claim 9, wherein the method further comprises the step of:
generating a new sorted list of items based on the modified filter parameters.

12. The method according to claim 9, wherein the method further comprises the step of:
generating a new sorted list of items based on the determined like-degree indicating factors of the feature-value pairs characterizing the items.

13. The method according to claim 11, wherein the method further comprises the steps of:
generating a graphical representation of the items in the new sorted list of items in an ordered manner on the display,
responding to the physical user interface so as to further allow a user to re-order and/or drop items in the graphical representation of the new sorted list of items,
modifying the rank of the items in the new sorted list according to a graphical representation after rearrangement in response to the physical user interface, and
modifying a relative rating history based on the re-ordered list and generating from the modified relative rating history a modified set of filter parameters and/or determining a like-degree indicating factor for at least some of the feature-value pairs characterizing the items in the re-ordered new list so that a product of feature-value pair like-degree indicating factors for a particular item matches the rank of the items in the re-ordered list when compared to a product of feature-value pair like-degree indicating factors of other items in the reordered list.

* * * * *